Feb. 6, 1934. K. L. HERRMANN 1,946,441
MECHANISM AND METHOD OF FINISHING ROLLERS
Filed Nov. 17, 1933   2 Sheets-Sheet 2
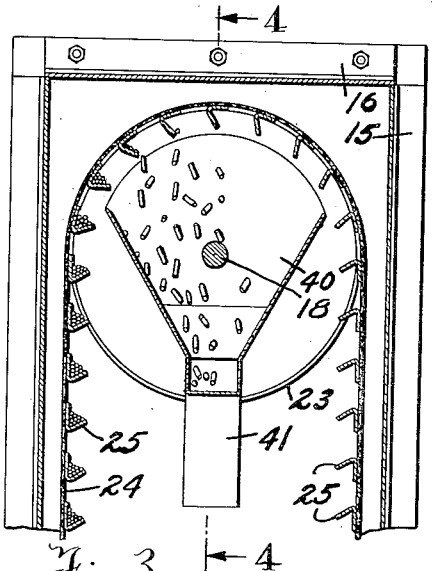
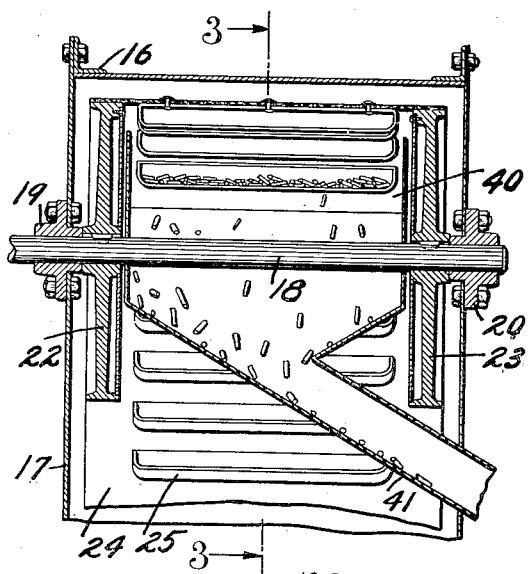
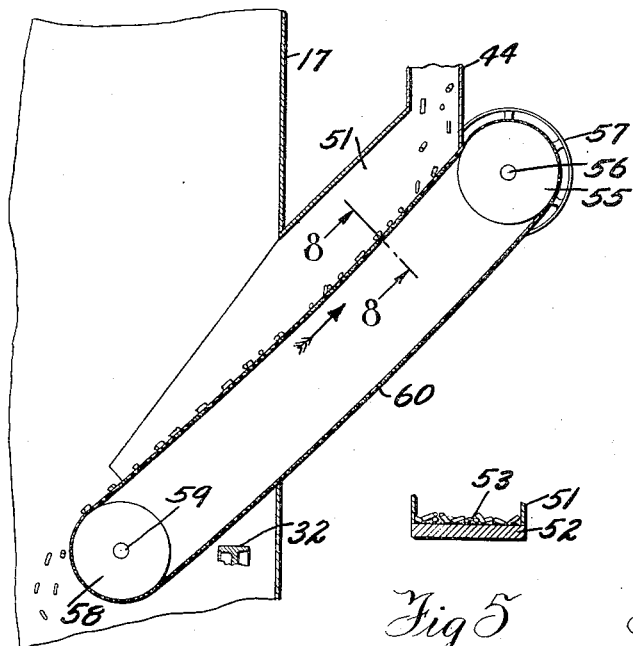
INVENTOR.
Karl L. Herrmann
BY
ATTORNEYS.

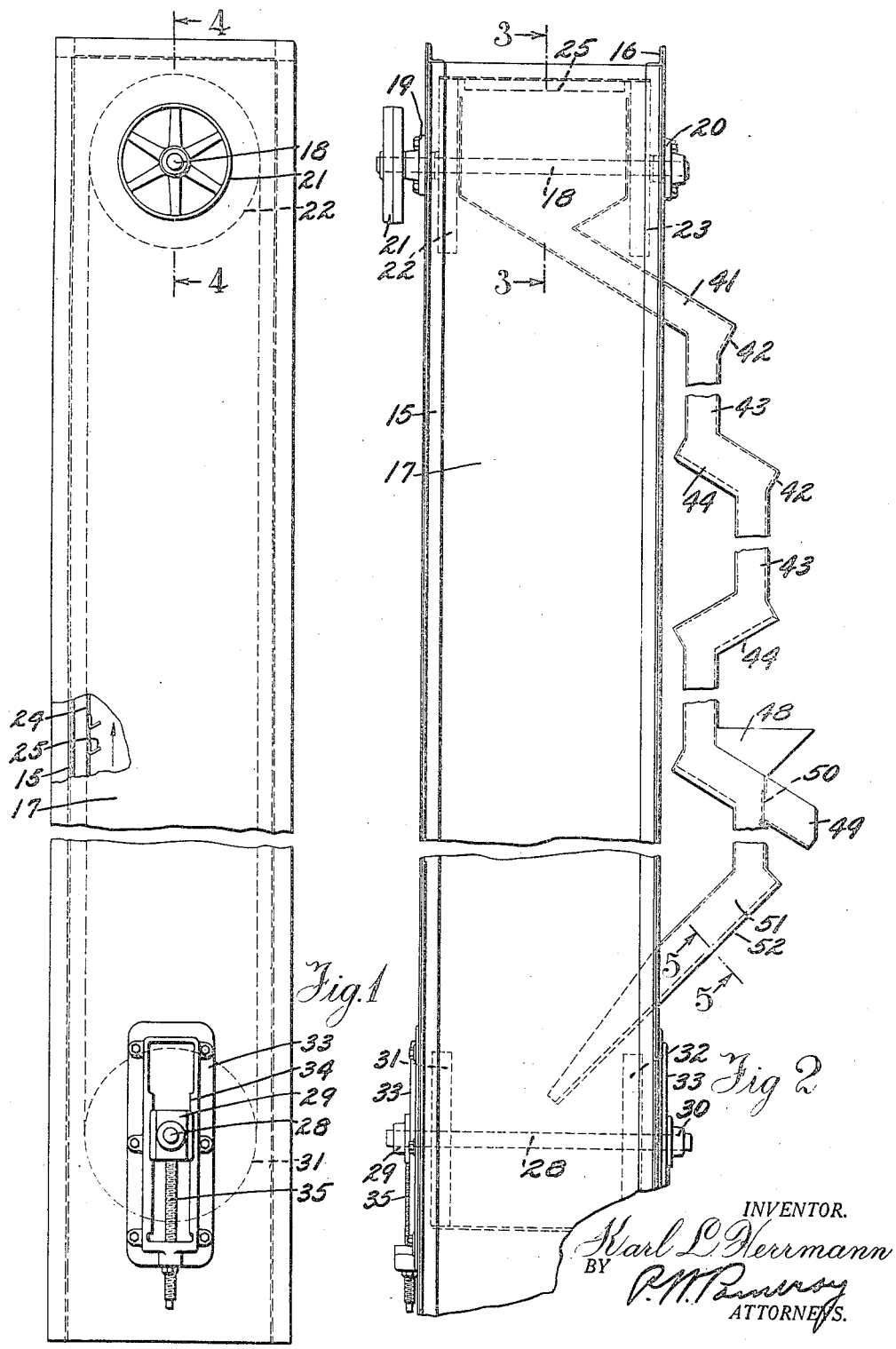

Patented Feb. 6, 1934

1,946,441

UNITED STATES PATENT OFFICE 1,946,441

MECHANISM AND METHOD OF FINISHING ROLLERS

Karl L. Herrmann, South Bend, Ind., assignor to The Bantam Ball Bearing Company, South Bend, Ind., a corporation of Indiana Application November 17, 1933
Serial No. 698,504

15 Claims. (Cl. 51—2)

This invention pertains to apparatus for manufacturing roller bearings and an improved method of manufacturing such bearings, and relates particularly to improvements in the apparatus and method of manufacturing small rollers known as needle bearings, and has for its principal object the provision of a machine to round the ends and smooth the corners of large quantities of such rollers in a minimum length of time and economically.

A further object lies in the provision of a machine and a method for tumbling rollers wherein the ends of such rollers are rounded and the corners are smoothed off without destroying the cylindrical form of the bearing faces of the rollers.

A still further object is to provide a machine having an elevator for elevating the rollers and means associated therewith whereby the rollers are successively caused to strike head-on against an impact surface and then jostled and tumbled to wear away any upset portions thereof due to the striking of the ends of the rollers against the impact surface.

A further object is to provide a machine so constructed as to cause the ends of the rollers to strike head-on against an impact surface after which their frictional contact with an abrasive will wear away the upset portions of the rollers caused by the striking of the ends of the rollers against the impact surface.

Still another object is to provide a machine including an elevator for elevating the rollers and means associated therewith whereby the rollers are caused to successively strike head-on against an impact surface and intermediate each striking operation they are tumbled to thereby round off the ends of the rollers and remove any upset portions at the edges thereof.

Another object is to provide in a machine of the type described provided with an inclined surface having an abrasive thereon adapted to wear away any upset portions of the rollers produced by the striking of the ends thereof against an impact surface.

A further object lies in providing an improved method wherein the rollers are elevated, and then dropped so that the ends of such rollers are rounded and polished and the cylindrical faces of the rollers adjacent to the ends are smoothed off during the process of rounding the ends.

The accompanying drawings are illustrative of a suitable machine and the method of carrying out my invention. The drawings, however, are to be taken as illustrative only and not as limiting the invention, the scope of which is to be measured entirely by the scope of the sub-joined claims.

In the drawings in which like numerals refer to like parts throughout the several views, Fig. 1 is an elevational view of a machine adapted for use in carrying out my improved method referred to above.

Fig. 2 is a side elevational view of the machine, certain parts being illustrated in dotted lines to better show my invention.

Fig. 3 is a fragmentary sectional view taken on the line 3—3 of Figs. 2 and 4, showing a portion of the roller elevating means and the chute for receiving the rollers from the elevator.

Fig. 4 is a fragmentary sectional view taken on the line 4—4 of Figs. 1 and 3, showing further details of the elevator and chute.

Fig. 5 is a detailed sectional view taken on the line 5—5 of Fig. 2, showing a portion of the chute which discharges the rollers onto the elevator.

Fig. 6 is a fragmentary detailed sectional view of a portion of the chute, showing the hopper for loading the rollers into the machine and the discharge outlet whereby the rollers may be taken from the machine.

Fig. 7 is a fragmentary sectional view, showing a portion of the chute for discharging the rollers onto the elevator and a modified means for smoothing off the corners of the rollers.

Fig. 8 is a fragmentary sectional view taken on the line 8—8 of Fig. 7.

Fig. 9 is an elevational view of the roller blank as it is first cut from stock and placed in the machine.

Fig. 10 is an elevational view of the roller blank in its partly finished state, and Fig. 11 is an elevational view of the finished roller in condition for finished grinding.

My present invention relates to a machine and the method of finishing rollers for roller bearings, the blanks for which are cut from stock in a convenient and conventional method, such blanks being illustrated in Fig. 9. The blanks 10 as cut from stock preferably have a diameter slightly greater than the diameter of the finished roller after it has been ground and polished and such blanks usually have ends which are somewhat rough and which may have sharp edges as indicated at 11 or extensions caused by the cutting as indicated at 12.

A machine suitable for finishing such rollers may have a plurality of uprights 15 preferably formed of angle iron suitably connected by cross members 16 also formed of angle iron and having a covering 17 of sheet metal or any other material suitable for that purpose. A shaft 18 mounted in bearings 19 and 20 extends through the machine and is supported by the uprights 15, the shaft 18 being driven by any suitable source of power such as a belt-pulley 21. Mounted on the shaft 18 between the uprights 15 are a pair of spaced pulleys 22 and 23 which are adapted to rotate a belt 24 having suitable troughs or fins 25 secured thereon. The troughs 25 extend between the pulleys 22 and 23 as shown in dotted lines in Fig. 2 and in full lines in Fig. 4. A shaft 28 carried in suitable journals 29 and 30 extends through the machine adjacent to the bottom thereof and has pulleys 31 and 32 thereon corresponding with the pulleys 22 and 23 on the shaft 18 for receiving the belt 24 and to assist in the elevation of the rollers as is clearly evident from the inspection of the drawings.

To take up slack in the belt 24 as the same becomes stretched due to the loads carried thereby, I preferably provide means for adjusting the vertical height of the shaft 18 and the pulleys 31 and 32 carried thereby, which device may comprise brackets 33 suitably supported on opposite sides of the machine and having ways 34 thereon slidably receiving the journals 29 and 30, the height of the journals and, therefore, the shaft 28 being adjustably controlled by the screws 35. I do not, however, wish to be limited to the detailed construction illustrated as to the means for taking up slack in the belt 24 as any suitable belt adjusting means may be employed.

When the rollers are elevated to the top of the machine by the travel of the belt 24 and fins 25 carried thereby, they are dumped into a hopper 40 as illustrated in Figs. 3 and 4, the side walls of the hopper being preferably so formed that the rollers will not be thrown out of the hopper in contact with the driving pulleys 22 and 23 to interfere with the operation of the same. For convenience in illustration and description, I have shown the chute for returning the rollers to the bottom of the machine as being partly outside of the casing 17, although it is to be clearly understood that this part of the mechanism may be wholly within the casing without changing the method of finishing the rollers or changing the operation of the device. Leading from the hopper 40 is an inclined chute 41 through which the rollers are tumbled, this chute having an end wall 42 against which the rollers will strike, it being understood that a considerable number of the rollers will strike head-on against this end wall with such velocity that the impact will cause a slight upsetting of the ends of the rollers, thus tending to slightly round the ends thereof. The rollers are then directed through a vertical portion 43 of the chute to again strike against an inclined portion 44, some of the rollers striking head-on against the bottom of the chute which is of sufficient rigidity to provide a suitable impact member to again cause a further slight rounding of the ends. As illustrated, the rollers are caused to drop and slide or tumble several times on their travel from the hopper 40 to the bottom of the machine. This dropping and sliding and tumbling of the rollers a suitable number of times will act on the rollers to round the ends thereof and wear away the sharp corners to a considerable extent between each elevating operation.

Positioned on the chute at any suitable location is a roller loading hopper 48 and a discharge chute 49. A swinging gate 50 may be adjusted to the position shown in Fig. 6 to discharge the rollers out of the chute 49 after they have been finished, or the gate may be swung to the position shown in dotted lines in Fig. 2 so that the rollers will carry on through a vertical portion 43 of the chute and back into the machine through the inclined chute portion 51. On the floor 52 of the portion 51 of the chute I preferably spread an abrasive material such as emery cloth 53 or other suitable abrasive suitable for wearing away the upset portions of the rollers.

As the rollers slide along the inclined chute 51, they will tumble against the abrasive 53 which will assist in rounding the corners to remove any upset portions adjacent to the ends and thus maintain the bearing surfaces of the rollers cylindrical throughout their length. The chute 51 discharges the rollers on to the belt 24 so that they may again be elevated by the troughs or fins 25 to repeat the operation just described.

In Figs. 7 and 8, I have shown a slightly modified form of the invention and particularly the abrasive means for wearing away the upset portions of the rollers. I have shown a pulley 55 mounted on a shaft 56 rotated by any suitable power source such as a belt pulley 57. The pulley 58 mounted on a shaft 59 is suitably supported within the machine and driven by these pulleys is a belt 60. The belt 60 is preferably driven in the direction of the arrow in Fig. 7 or in the direction opposite to the direction of travel of the rollers to thus retard the travel of the rollers and more rapidly wear away any upset portions thereof. The belt 60 preferably has an abrasive on its outer face such as emery dust or other suitable material to act on the rollers for the purpose specified. The weight of the rollers on the belt 60 will cause the same to sag as shown in Fig. 8 and as the rollers pile up on the belt, they will be jostled and tumbled about so that the high spots on the rollers will come in contact with the abrasive and be worn away thereby.

The operation of the device is as follows: The rollers are dumped into the machine through the hopper 48 so that they will slide down through the chute 51 on to the belt 24 and by its travel in the direction of the arrow shown on Fig. 1, they are picked up and carried by the troughs or fins 25 to discharge into the hopper 40. The rollers will then slide or tumble along the chute 41, strike against the end wall 42 and then drop down through the vertical chute 43 to strike against the impact surface 44. This operation of the rollers will be repeated a number of times until the rollers finally reach the chute 51 on which is provided an abrasive so that as the rollers pass thereover any upset portions or rough spots on the rollers will be worn away. The operation just described may be repeated a sufficient length of time to round the rollers the desired amount and smooth off the corners until the rollers are finally finished to the finished state as indicated in Fig. 11.

The belt 60 having the abrasive thereon as illustrated in Fig. 7 is designed to wear away the high spots on the rollers somewhat faster than that indicated in Fig. 2; however, the mode of operation of rounding the rollers and successfully wearing away any upset portions thereof is substantially the same in both modifications.

The machine such as I have illustrated is designed to rapidly and economically finish the rollers as heretofore described and to permit the finishing of such rollers in a minimum length of time.

While I have shown a suitable embodiment of a device for finishing rollers and a method of finishing the same, it is to be understood that formal changes and changes relating to details of construction and manufacture may be resorted to without departing from the spirit and scope of my invention, the scope of which is commensurate with the appended claims.

What I claim is:

1. A machine for rounding the ends of rollers comprising, means for elevating said rollers, and a chute including an impact surface for returning said rollers to a position to again be elevated.

2. A machine for rounding the ends of rollers comprising, means for elevating said rollers, and a chute having a plurality of inclined and vertical portions for returning said rollers to a position to again be elevated.

3. A machine for finishing the ends of rollers comprising, a chute having a plurality of inclined and vertical portions and impact surfaces against which the ends of said rollers are directed to strike.

4. A machine for finishing the ends of rollers comprising, a chute having a plurality of inclined and vertical portions, impact surfaces against which the ends of said rollers are directed to strike, and abrasive means to smooth off any upset portions of said rollers.

5. A machine for finishing the ends of rollers comprising, means for elevating said rollers, a chute having a plurality of inclined portions and vertical portions therebetween for returning said rollers to a position to again be elevated, and impact surfaces associated with the inclined portions of said chute against which the ends of said rollers are directed to strike.

6. A machine for finishing the ends of rollers comprising, means for elevating said rollers, a chute having a plurality of inclined portions and vertical portions therebetween for returning said rollers to a position to again be elevated, impact surfaces associated with the inclined portions of said chute against which the ends of said rollers are directed to strike, and abrasive means to smooth off any upset portions of said rollers.

7. A machine for finishing the ends of rollers for roller bearings comprising, an endless conveyor for elevating said rollers, a hopper for receiving said rollers from said conveyor, and a chute connected with said hopper for returning said rollers to said conveyor, said chute having a plurality of spaced inclined portions and connecting vertical portions.

8. A machine for finishing the ends of rollers for roller bearings comprising, an endless conveyor for elevating said rollers, a hopper for receiving said rollers from said conveyor, a chute connected with said hopper for returning said rollers to said conveyor, and means on said chute for loading said rollers into said machine.

9. A machine for finishing the ends of rollers for roller bearings comprising, an endless conveyor for elevating said rollers, a hopper for receiving said rollers from said conveyor, a chute connected with said hopper for returning said rollers to said conveyor, means on said chute for loading said rollers into said machine, and means on said chute for unloading said rollers from said machine.

10. A machine for finishing the ends of rollers for roller bearings comprising, an endless conveyor for elevating said rollers, a hopper for receiving said rollers from said conveyor, a chute connected with said hopper for returning said rollers to said conveyor, and means in said chute to smooth off any upset portions of said rollers.

11. The method of forming smooth rounded ends on rollers for roller bearings which comprises, elevating the rollers, and successively sliding and dropping the rollers a plurality of times intermediate each elevating operation.

12. The method of forming smooth rounded ends on rollers for roller bearings which comprises, elevating the rollers, sliding the rollers to strike head-on against an impact surface, and dropping the rollers to strike against an impact surface.

13. The method of forming smooth rounded ends on rollers for roller bearings which comprises, sliding the rollers to strike against an impact surface, dropping the rollers to strike against an impact surface, and passing the rollers over an abrasive surface.

14. The method of forming smooth rounded ends on rollers for roller bearings which comprises, elevating the rollers, discharging the rollers against an impact surface, and passing the rollers over an abrasive surface.

15. The method of forming smooth rounded ends on rollers for roller bearings which comprises, elevating the rollers, discharging the rollers in a manner so that they will strike head-on against an impact surface a plurality of times intermediate each elevating operation, and passing the rollers over an abrasive surface.

KARL L. HERRMANN.